US011885338B2

(12) United States Patent
Urac et al.

(10) Patent No.: US 11,885,338 B2
(45) Date of Patent: Jan. 30, 2024

(54) HOUSING FOR A CENTRIFUGAL COMPRESSOR

(71) Applicant: PRATT & WHITNEY CANADA CORP., Longueuil (CA)

(72) Inventors: Tibor Urac, Mississauga (CA); Bernard Chow, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 52 days.

(21) Appl. No.: 17/180,262

(22) Filed: Feb. 19, 2021

(65) Prior Publication Data

US 2022/0268285 A1 Aug. 25, 2022

(51) Int. Cl.

| | |
|---|---|
| ***F04D 17/10*** | (2006.01) |
| ***F01D 9/04*** | (2006.01) |
| ***F04D 29/42*** | (2006.01) |
| ***F01D 5/04*** | (2006.01) |

(52) U.S. Cl.

CPC ............. *F04D 17/10* (2013.01); *F01D 5/043* (2013.01); *F01D 9/045* (2013.01); *F04D 29/4206* (2013.01); *F05D 2220/32* (2013.01); *F05D 2240/24* (2013.01)

(58) Field of Classification Search

CPC ....... F04D 29/4206; F04D 17/10; F01D 9/045

See application file for complete search history.

(56) References Cited

U.S. PATENT DOCUMENTS 4,264,271 A * 4/1981 Libertini ................. F01D 11/08 415/173.3
5,555,721 A 9/1996 Bourneuf et al.
2013/0202428 A1* 8/2013 Renard ................. F01D 25/246 415/208.1
2017/0248155 A1* 8/2017 Parker ........................ F02C 6/08
2019/0383304 A1* 12/2019 Aker ................... F04D 29/4206

FOREIGN PATENT DOCUMENTS

FR 2987874 9/2013

OTHER PUBLICATIONS

Taylor et al., "The variable-radius notch: Two new methods for reducing stress concentration", Dec. 30, 2010, Engineering Failure Analysis, vol. 18 (Year: 2010).*

* cited by examiner

*Primary Examiner* — Topaz L. Elliott

*Assistant Examiner* — Michael K. Reitz

(74) *Attorney, Agent, or Firm* — NORTON ROSE FULBRIGHT CANADA LLP

(57) ABSTRACT

A centrifugal compressor, has: an impeller; and a housing including: a shroud extending between a first end and a second end; a structural member having an outer end securable to a casing of the gas turbine engine, an inner end of the structural member intersecting the rear side of the shroud; and a reinforced region at the location where the structural member and the rear side of the shroud intersect, a thickness of the reinforced region in a direction normal to the gaspath side greater than a nominal thickness of the shroud, the reinforced region defining a curved surface extending from a first location on the structural member to a second location on the rear side of the shroud, a portion of the curved surface having a radius that increases from a first radius to a second radius at the second location.

20 Claims, 5 Drawing Sheets

HOUSING FOR A CENTRIFUGAL COMPRESSOR

TECHNICAL FIELD

The present disclosure relates generally to centrifugal compressors and turbines of gas turbine engines and, more particularly, to housings disposed around impellers of such centrifugal fluid machines.

BACKGROUND

A centrifugal fluid machine, such as a centrifugal compressor, generally includes an impeller which rotates within a housing disposed around the impeller. The impeller includes a hub mounted to a drive shaft so as to be rotated therewith. Vanes (i.e., blades) of the impeller extend from the hub and are typically arranged to redirect an axially-directed inbound gas flow radially outwardly. The housing is disposed as close as possible to tips of the blades such as to minimize tip clearance and thereby maximize an amount of a fluid being worked on by the impeller. Stresses may however be imparted on the housing, such as a result of the pressure of the fluid flowing through the impeller. These stresses can locally vary the tip clearance, which can impair efficiency of the machine. Such stresses may be higher at an exit of the impeller, where the pressure is greatest. Improvements are therefore sought.

SUMMARY

In one aspect, there is provided a centrifugal compressor for a gas turbine engine, comprising: an impeller having blades extending from a hub to blade tips, the impeller having an inlet and an outlet; and a housing disposed around the impeller, the impeller rotatable relative to the housing about a central axis, the housing including: a shroud annularly extending around the blade tips of the impeller and extending in a streamwise direction between a first end proximate the inlet of the impeller and a second end proximate the outlet of the impeller, the shroud having a gaspath side facing the impeller and a rear side opposed to the gaspath side; a structural member supporting the shroud, the structural member having an outer end securable to a casing of the gas turbine engine, an inner end of the structural member intersecting the rear side of the shroud at a location between the first end and the second end; and a reinforced region at the location where the structural member and the rear side of the shroud intersect, a thickness of the reinforced region in a direction normal to the gaspath side being greater than a nominal thickness of the shroud outside the reinforced region, the reinforced region defining a curved surface extending from a first location on the structural member to a second location on the rear side of the shroud, the second location being disposed between the structural member and the second end of the shroud, a portion of the curved surface having a radius that increases from a first radius to a second radius at the second location.

The centrifugal compressor as defined above and herein may further include, in whole or in part, and in any combination, one or more of the following features.

In some embodiments, the portion of the curved surface is a second zone of the curved surface, the curved surface having a first zone extending from the first location to the second zone, the first zone having a constant radius.

In some embodiments, the shroud has a radially-outer portion extending from a projection of the structural member on the gaspath side to the second end, the radially-outer portion having a radial height from the projection to the second end along a radial direction relative to the central axis, a radius of the first zone ranging from 10% to 40% of the radial height.

In some embodiments, the first radius ranges from 17% to 35% of the radial height.

In some embodiments, the portion of the curved surface merges into the shroud toward the second end of the shroud.

In some embodiments, the thickness of the shroud is maximal at the first location of the reinforced region and decreases to the nominal thickness toward the second end of the shroud.

In some embodiments, the thickness continuously and monotonically decreases from the first location to the second location.

In some embodiments, the thickness reaches the nominal thickness between the inner end of the structural member and the second end.

In some embodiments, the second location is closer to the second end than to the inner end of the structural member.

In some embodiments, the shroud has a radially-outer portion extending radially outwardly from a projection of the structural member on the gaspath side to the second end, the radially-outer portion having a radial height from the projection to the second end along a radial direction relative to the central axis, the second location being at least 20% of the radial height from the projection.

In some embodiments, an intersection between the structural member and the rear side of the shroud is located proximate a knee of the shroud, the knee corresponding to a point where a radial component of a vector normal to the gaspath side of the shroud is equal to an axial component of the vector.

In some embodiments, the intersection is located at from 30% to 70% of a length of the shroud from the first end, the length of the shroud extending from the first end to the second end along the gaspath side.

In another aspect, there is provided an impeller housing for an impeller of a centrifugal compressor of a gas turbine engine, comprising: a shroud annularly extending around a central axis, the shroud having a gaspath side facing the central axis and an opposed rear side, the shroud having a first end proximate an inlet of the impeller and a second end proximate an outlet of the compressor; a structural member supporting the shroud, the structural member having an outer end securable to a casing of the gas turbine engine, an inner end of the structural member intersecting the rear side of the shroud at a location between the first end and the second end; and a reinforced region at the location where the structural member and the rear side of the shroud intersect, a thickness of the reinforced region in a direction normal to the gaspath side greater than a nominal thickness of the shroud outside the reinforced region, the reinforced region extending from a first location on the structural member to a second location on the rear side of the shroud, the second location between the structural member and the second end, a ratio of a radial distance (D3) relative to the central axis from the second end to the second location to a radial height (H1) of a portion of the shroud that extends radially outwardly beyond the inner end of the structural member being at most 0.8.

The an impeller housing for an impeller of a centrifugal compressor as defined above and herein may further include, in whole or in part, and in any combination, one or more of the following features.

In some embodiments, a radius of the reinforced region ranges from 10% to 40% of the radial height.

In some embodiments, the first radius ranges from 17% to 35% of the radial height.

In some embodiments, the portion extends from a projection of the structural member on the gaspath side of the shroud to the second end.

In some embodiments, a thickness of the shroud taken in a direction normal to the gaspath side is maximal at the first location and decreases to a nominal thickness toward the second end of the shroud.

In some embodiments, the thickness continuously and monotonically decreases from the first location to the second location.

In some embodiments, an intersection between the structural member and the rear side of the shroud is located proximate a knee of the shroud, the knee corresponding to a point where a radial component of a vector normal to the gaspath side of the shroud is equal to an axial component of the vector.

In some embodiments, the intersection is located at from 30% to 70% of a length of the shroud from the first end, the length of the shroud extending from the first end to the second end along the gaspath side.

BRIEF DESCRIPTION OF THE DRAWINGS

Reference is now made to the accompanying figures in which.

DETAILED DESCRIPTION

The following disclosure relates generally to gas turbine engines, and more particularly to centrifugal fluid machines, such as compressor and turbines, that may be present in a compressor section and/or a turbine section of a gas turbine engine. In some embodiments, the assemblies and methods disclosed herein promote better performance of gas turbine engines, such as by improving flow conditions in the compressor section and/or turbine section in some operating conditions, improving the operable range of the compressor/turbine, and reducing energy losses.

Figure 1:
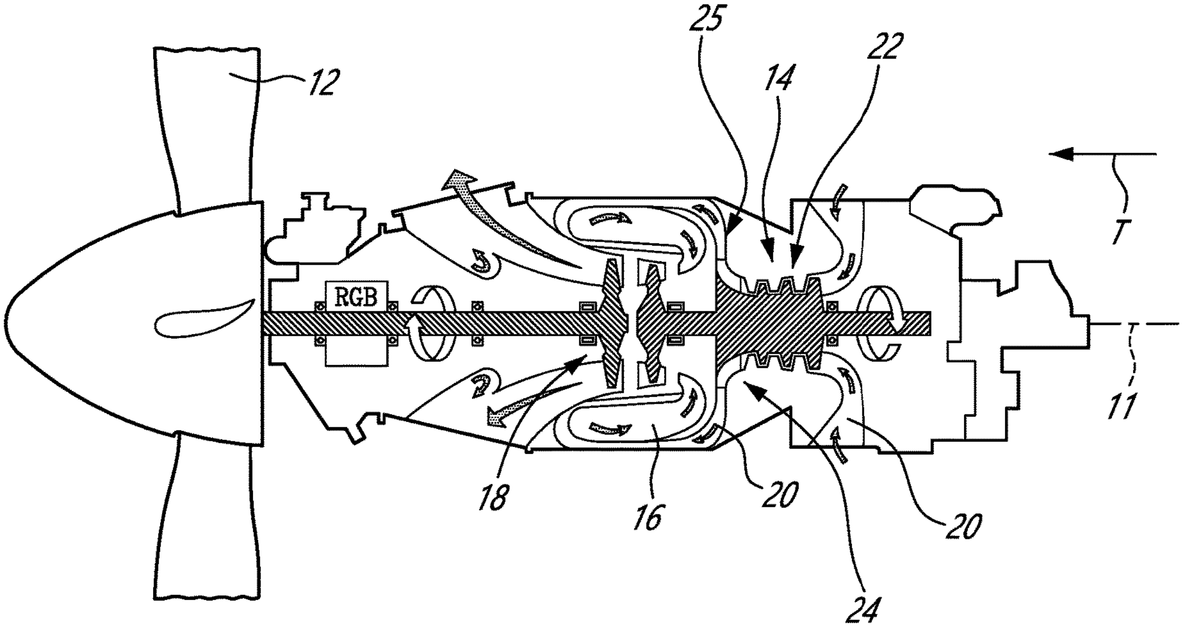
FIG. 1 is a schematic cross sectional view of a gas turbine engine.

FIG. 1 illustrates a gas turbine engine 10 of a type preferably provided for use in subsonic flight, and in driving engagement with a rotatable load, which is depicted as a propeller 12. The gas turbine engine has in serial flow communication a compressor section 14 for pressurizing the air, a combustor 16 in which the compressed air is mixed with fuel and ignited for generating an annular stream of hot combustion gases, and a turbine section 18 for extracting energy from the combustion gases. In the embodiment shown, the compressor section 14 of the gas turbine engine 10 includes an axial compressor 22 and a centrifugal compressor 24 downstream of the axial compressor 22.

It should be noted that the terms "upstream" and "downstream" used herein refer to the direction of an air/gas flow passing through an annular gaspath 20 of the gas turbine engine 10. It should also be noted that the term "axial", "radial", "angular" and "circumferential" are used with respect to a central axis 11 of the annular gaspath 20, which may also be a central axis of gas turbine engine 10. The gas turbine engine 10 is depicted as a reverse-flow engine in which the air flows in the annular gaspath 20 from a rear of the gas turbine engine 10 to a front of the gas turbine engine 10 relative to a direction of travel T of the gas turbine engine 10. This is opposite than a through-flow engine in which the air flows within the annular gaspath 20 in a direction opposite the direction of travel T, from the front of the engine towards the rear of the gas turbine engine 10. The principles of the present disclosure may apply to reverse-flow and through-flow engines and to any other gas turbine engines, such as a turbofan engine and a turboprop engine.

Figure 2:
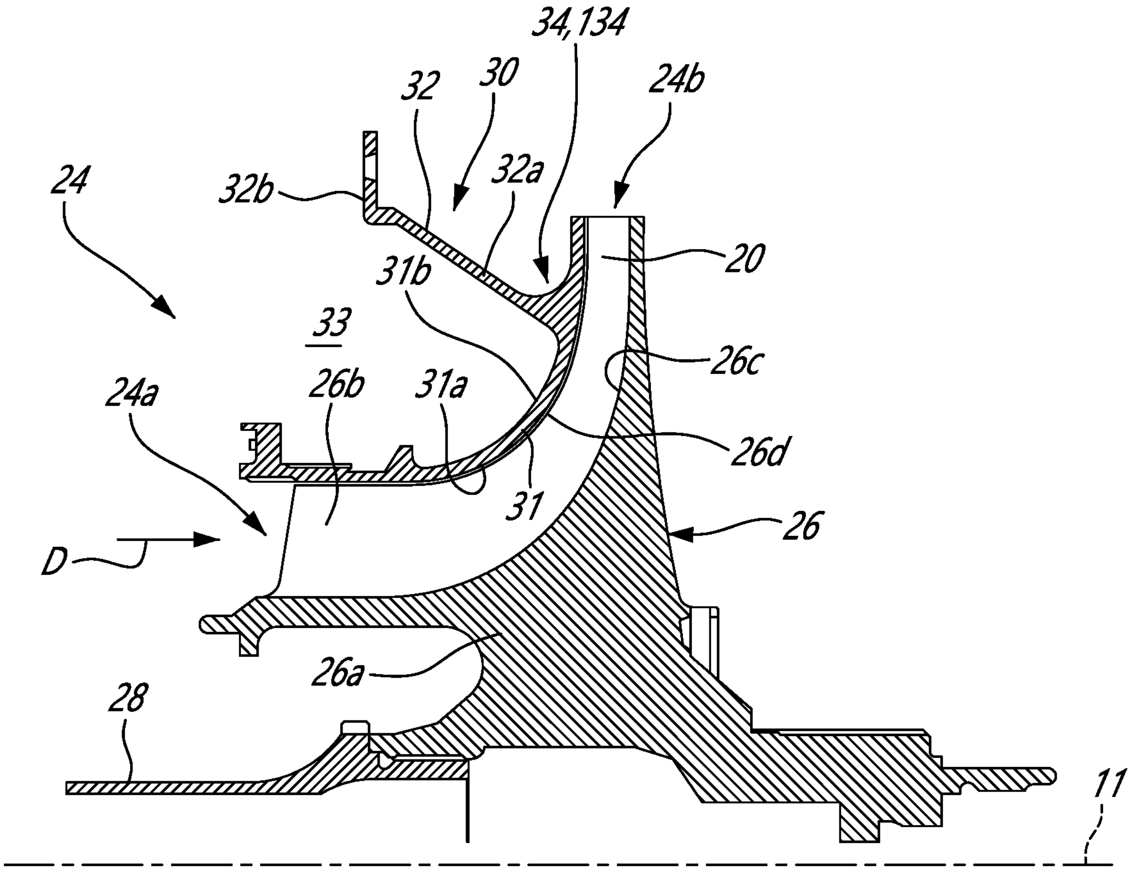
FIG. 2 is a schematic cross-sectional view of a centrifugal compressor of the engine of FIG. 1.

Referring to FIG. 2, the centrifugal compressor 24 includes an impeller 26 drivingly engaged by a shaft 28 of the gas turbine engine 10. The impeller 26 and the shaft 28 are rotatable about the central axis 11 of the gas turbine engine 10. The impeller 26 includes a hub **26*a* and blades 26*b* protruding from the hub 26*a*. The blades 26*b* are circumferentially distributed on the hub 26*a* about the central axis 11 and protrudes from the hub 26*a* from a root 26*c* at the hub 26*a* to a tip 26*d* spaced apart from the hub 26*a*. In use, compressed air flowing from the axial compressor 22 flows within a plurality of passages defined between the blades 26*b* of the impeller 26. A impeller housing 30 is disposed around the impeller 26. The impeller housing 30 includes a shroud 31 and a structural member 32 secured to the shroud 31 and used to secure the shroud 31 to a casing of the gas turbine engine 10. Namely, the structural member 32 has an outer end to be secured to the casing of the gas turbine engine 10 and an inner end intersecting the shroud 31. In the embodiment shown, the structural member 32 includes an annular wall 32*a* and an annular flange 32*b* at a distal end of the annular wall 32*a*. The annular flange 32*b* is configured to be bolted to a mating flange of the casing of the gas turbine engine 10. The shroud 31 is used to substantially limit air from flowing from one of the passages to the next around the tips 26*d* of the blades 26*b*. In other words, the air is contained into the annular gaspath 20, which includes the passages between the blades 26*b* of the impeller 26, by the hub 26*a*, the blades 26*b*, and by the shroud 31. To be as efficient as possible, it is desired to minimize as much as possible a gap, or tip clearance, between the tips 26*d* of the blades 26*b* and the shroud 31**.

The shape of the shroud 31 defines the impeller tip clearance. The tip clearance is meant to be as small as possible to maximize an amount of air entering the compressor that is being compressed. A clearance of zero would be ideal. However, in reality, there are part growths and movements that occur during engine operation as well as manufacturing tolerances that make this difficult to achieve. Care should be taken to ensure that the blades **26*b* never rub against the shroud 31** since such a rubbing action may cause a detriment to the engine performance and component life. Reducing the impeller shroud deflection may be a key design requirement in order to minimize tip clearance as discussed below.

Still referring to FIG. 2, in use, air enters the passages defined circumferentially between the blades **26*b* along a streamwise direction depicted by arrow D from an inlet 24*a* of the impeller 26 to an outlet 24*b* thereof. The streamwise direction is a direction of the flow from the inlet 24*a* to the outlet 24***b* of the impeller 26. While the air flows from the inlet 24*a* to the outlet 24*b*, it deviates from being mainly axial relative to the central axis 11 to being mainly radial relative to the central axis 11. Herein, the expression "mainly" as in "mainly axial" implies that a direction is more than 50% axial. Similarly, "mainly radial" implies that a direction is more than 50% radial. The principles of the present disclosure apply to any centrifugal fluid machine, such as a centrifugal compressor as discussed below or a centrifugal turbine. As seen in FIG. 1, a diffuser 25 of the centrifugal compressor 24 is disposed downstream from the outlet 24*b* of the impeller 26. The diffuser 25 may be a suitable pipe diffuser or vane diffuser, for example, which serve to diffuse the air exiting the impeller to further increase the pressure thereof.

Figure 3:
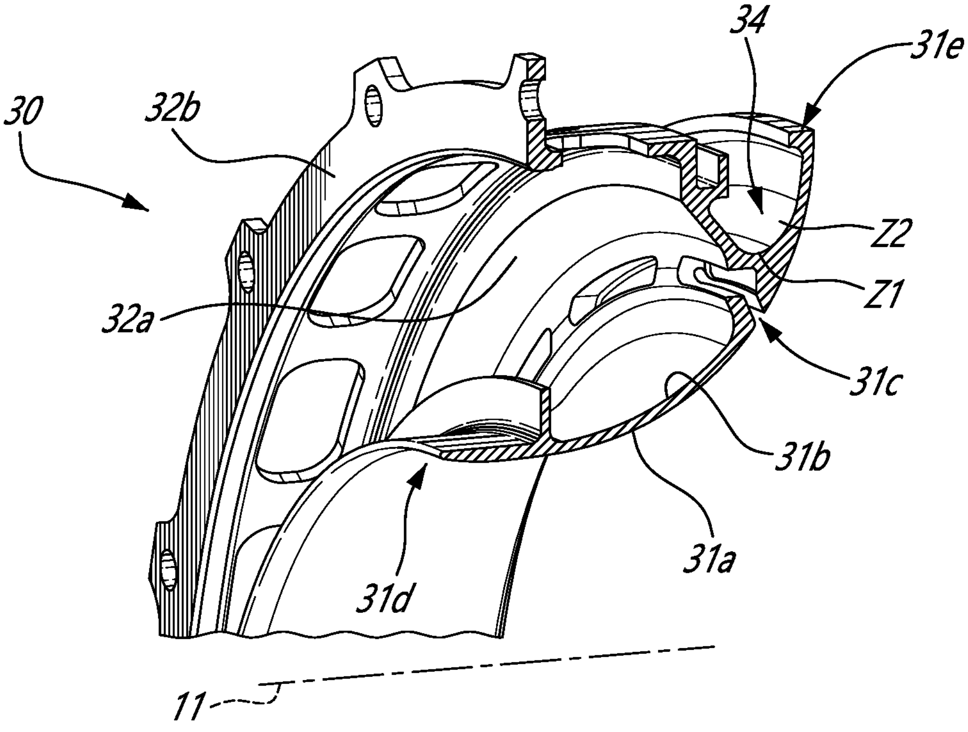
FIG. 3 is a three dimensional cutaway view of a shroud in accordance with one embodiment disposed around an impeller of the centrifugal compressor of FIG. 2.
Figure 4:
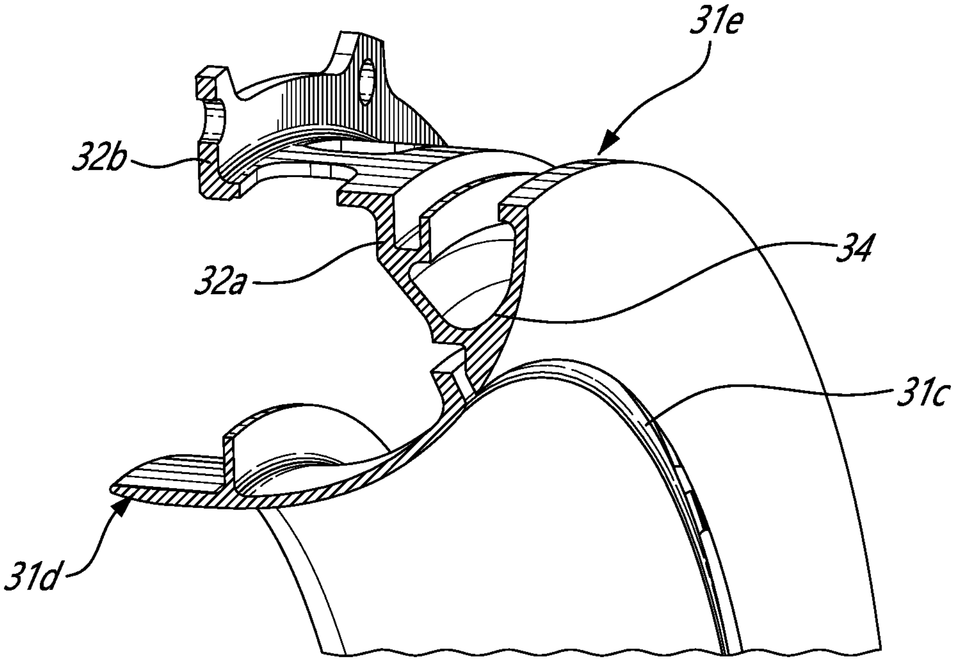
FIG. 4 is another three dimensional cutaway view of the shroud of FIG. 3 illustrated at a different angle.

The shroud 31 includes a gaspath side 31*a* and an opposed rear side 31*b*, also referred to as cavity side facing away from the annular gaspath 20. An opening, such an aperture or a slot 31*c* (FIG. 3) is defined by the shroud 31 and extends from the gaspath side 31*a* through the shroud 31 to the rear side 31*b*. The slot 31*c* opens to a cavity 33 that is used to receive compressed air bled from the annular gaspath 20 within the centrifugal compressor 24. From the cavity 33, the air bled from the annular gaspath 20 is directed to components, such as bearing housings, that are in need of compressed air for their operation.

In use, pressure of the air flowing through the centrifugal compressor 24 increases as the air moves radially outwardly away from the central axis 11 and toward the outlet 24*b* of the centrifugal compressor 24. As pressure increases, more force is applied on the gaspath side 31*a* of the shroud 31. This may deform the shroud 31 thereby increasing the radial gap between the shroud 31 at the gaspath side 31*a* and the tips 26*d* of the blades 26*b*. This may impair efficiency of an impeller. This may be caused by a portion of the shroud 31 being cantilevered from the structural member 32. The present shroud 31 has features that will be described herein below that may at least partially alleviate this phenomenon. Namely, the housing 30 has a reinforced region shown schematically at 34 in FIG. 2. This reinforced region 34 may help in alleviate the aforementioned phenomenon as discussed below.

Referring now to FIGS. 3-6, the housing 30 has thickening or reinforced region 34 at an intersection between the structural member 32 and the shroud 31. In some embodiments this intersection is located at or proximate a knee of the shroud 31. The knee of the shroud 31 is a location where a vector normal to the gaspath side 31*a* of the shroud 31 becomes more axial than radial. That is, a main component of this vector is in a radial direction relative to the central axis 11 from an inlet end 31*d* of the shroud 31 to the knee. This main component of this vector is in an axial direction relative to the central axis 11 from the knee to an outlet end 31*e* of the shroud 31. In other words, the knee corresponds to a point where a radial component of the vector normal to the gaspath side 31*a* of the shroud 31 is equal to an axial component of the vector. Still in yet other words, the shroud 31 may include an inducer section from an inlet to the knee and an exducer section form the knee to the outlet. The reinforced region 34 may extend annularly all around the central axis 11. The reinforced region 34 defines a concave portion of the rear side 31*b* of the shroud 31. The intersection between the structural member 32 and the shroud 31 may be located from plus or minus 10% of a length of the shroud 31 from the knee. The knee may be located from about 40% to about 60% of the length of the shroud 31 from the inlet end 31*d* of the shroud 31. The intersection may be located at from 30% to 70% of a length of the shroud from the first end, preferably from 40% to 60%.

Figure 5:
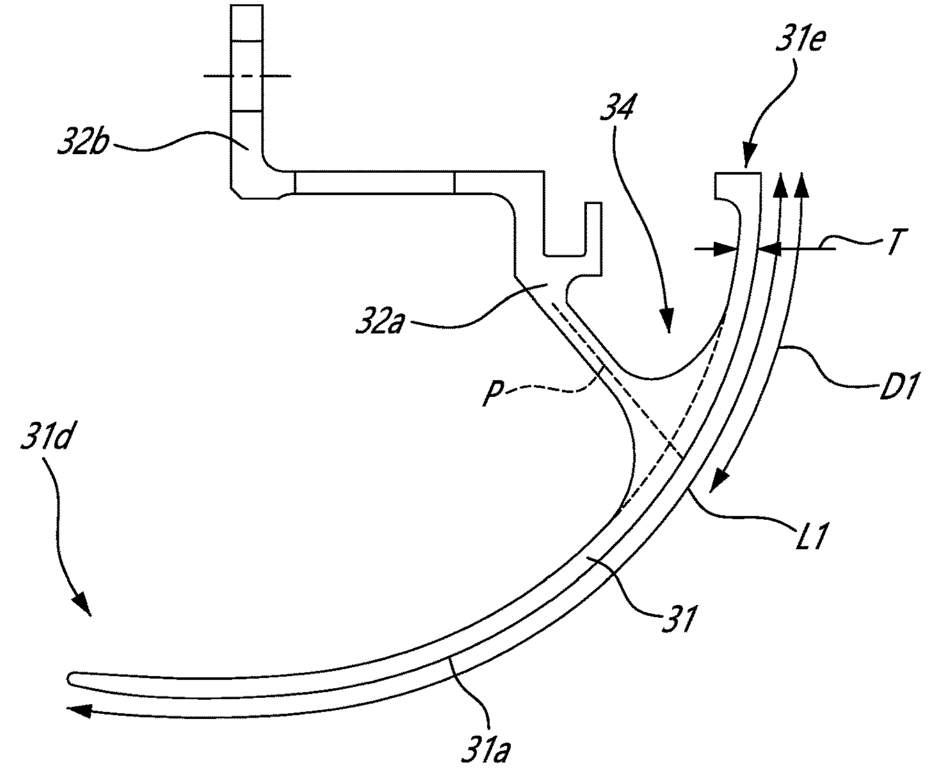
FIG. 5 is a cross-sectional view of the shroud of FIG. 3.
Figure 6:
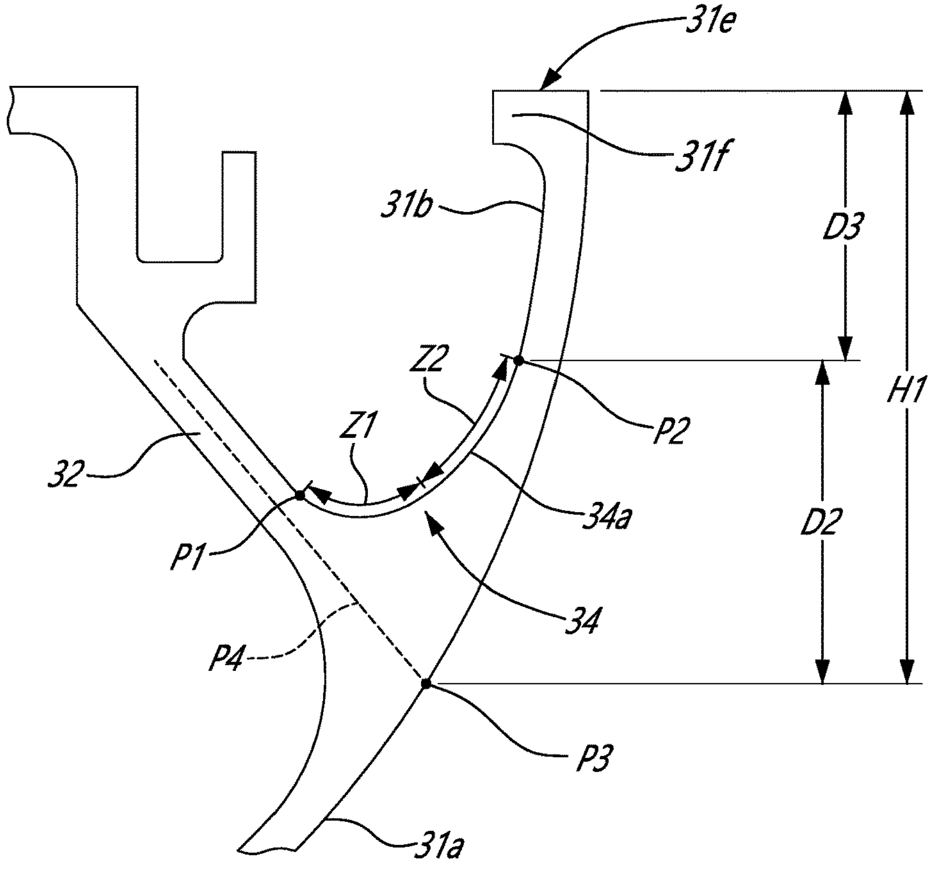
FIG. 6 is an enlarged view of a portion of FIG. 5.

Referring more particularly to FIGS. 5-6, the reinforced region 34 defines a curved surface 34*a* that extends from a first location P1 on the structural member 32 to a second location P2 on the rear side 31*b* of the shroud 31. The intersection between the structural member 32 and the shroud 31 may correspond to a location P3 on the shroud 31 intersected by a projection P4 of the structural member 32 onto the gaspath side 31*a* of the shroud 31. This location is referred to below as the intersection location P3. The intersection is located between the inlet end 31*d* of the shroud 31 and the outlet end 31*e* of the shroud 31. The outlet end 31*e* is located radially outwardly of the inlet end 31*d* relative to the central axis 11. It will be understood that the disclosed shroud 31 may be used as a turbine shroud and the outlet would be located radially inwardly of the inlet.

The reinforced region 34 is located between the structural member 32 and the outlet end 31*e* of the shroud 31. The reinforced region 34 is meant to increase a stiffness of a radially-outer portion of the shroud 31 that extends radially outwardly beyond the intersection with the structural member 32 and that is cantilevered. In the embodiment shown, the reinforced region 34 is located at the intersection since a moment of force exerted by air pressure on the shroud 31 is the greatest at the intersection. The reinforced region 34 merges into the rear side 31*b* of the shroud 31. That is, the shroud 31 has a nominal thickness T that corresponds to a thickness of the shroud 31 without and/or outside the reinforced region 34. The nominal thickness T may be taken in a direction normal to the gaspath side 31*a* of the shroud 31. In one particular embodiment, a thickness of the shroud 31 near the inlet end 31*d* may correspond to the nominal thickness T. In another embodiment, the thickness of the shroud at a location about midpoint between the inlet end 31*d* and the structural member 32 may correspond to the nominal thickness T. Regardless, the reinforced region 34 locally increases a thickness of the shroud 31 beyond the nominal thickness T—i.e. the thickness of the reinforced region 34 is greater than the nominal thickness T of the shroud 31.

In the embodiment shown, the intersection between the structural member 32 and the shroud 31 is closer to the outlet end 31*e* than to the inlet end 31*d* of the shroud 31. A ratio of a distance D1 between the outlet end 31*e* and the intersection location P3 between the structural member 32 and the shroud 31 along the gaspath side 31*a* of the shroud 31 to a length L1 of the shroud 31 from the inlet end 31*d* to the outlet end 31*e* along the gaspath side 31*a* ranges from 0.30 to 0.90, preferably from 0.50 to 0.80, preferably 0.70. In other words, the intersection may be located at from 30% to 70% of the length L1 of the shroud 31 from the inlet end 31*d*.

Referring more particularly to FIG. 6, the reinforced region 34 defines two zones, namely, a first zone Z1 and a second zone Z2. The first zone Z1 is located radially inwardly of the second zone Z2 relative to the central axis 11. More or less than two zones can be use. The first zone extends from the first location P1 on the structural member 32 to an intersection between the two zones Z1, Z2. The second zone Z2 extends from the first zone Z1 toward the outlet end 31*e* of the shroud 31 and to the second location P2 on the rear side 31*b* of the shroud 31. In the embodiment shown, both of the first and second zones Z1, Z2 of the reinforced region 34 extends annularly all around the central axis.

The first zone Z1 has a radius when seen on a plane containing the central axis 11 and intersecting the reinforced region 34. The radius of the reinforced region 34 at the first zone Z1 may be constant. The radius of the reinforced region 34 changes throughout the second zone Z2. That is, the second zone Z2 has a first radius at the intersection between the first and second zones Z1, Z2. The first radius Z1 corresponding to the constant radius of the first zone Z1. The second zone Z2 has a second radius where it merges back to the shroud 31. The second radius is located at an end of the second zone Z2, which corresponds to the second location P2. The second radius corresponds to a radius of the shroud 31 where the thickness of the shroud 31 becomes the nominal thickness T. If the rear side 31*b* of the shroud 31 is straight at the second location P2, the radius is infinite. In the context of the present disclosure, the expression "radius" is meant to imply the radius of curvature of a curve when taken on a plane containing the central axis 11 and intersecting the reinforced region 34.

The second zone Z2 may define a Euler's curve, also know as a clothoid, where a radius changes continuously along a length of the second zone Z2 toward the outlet end 31*e*. The radius of the reinforced region Z2 may change (e.g., increase) continuously and monotonically from the first zone Z1 toward the outlet end 31*e* along the second zone Z2. The thickness of the shroud 31 at the reinforced region 34 may continuously and monotonically decrease from the first location P1 to the second location P2. The second zone Z2 is used as a transition zone to blend the reinforced region 34 back into the shroud 31. The reinforced region 34 may be tangent to the rear side 31*b* of the shroud 31. The reinforced region 34 therefore locally increases a thickness of the shroud 31 beyond the nominal thickness T. This thickness decreases to the nominal thickness T in a direction extending away from the intersection toward the outlet end 31*e*. The thickness of the shroud 31 may therefore be maximal at the first zone Z1.

Still referring more particularly to FIG. 6, the portion of the shroud 31 that extends radially outwardly beyond the intersection with the structural member 32 has a radial height H1 taken in a radial direction relative to the central axis 11. The radial height H1 starts from the intersection location P3 on the shroud 31 and ends at the outlet end 31*e* of the shroud 31. In the embodiment shown, the second location P2 where the reinforced region 34 merges back to the rear side 31*b* of the shroud 31 may be located closer to the outlet end 31*e* than to the intersection location P3. The second location P2 is selected to minimize weight without compromising its reinforcement function. The second location P2 is selected in function of the thickness of the shroud 31, pressure distribution on the shroud 31, operating conditions of the centrifugal compressor 24, as well as a stiffness of the material selected for the shroud 31. In an embodiment, the second location P2 may register with the outlet end 31*e*.

A ratio of a distance D2 from the intersection location P3 to the second location P2 to the radial height H1 of the portion of the shroud 31 that extends radially outwardly beyond the intersection is at least about 0.25 and at most 1, preferably at least about 0.3 and, in some cases, from 0.30 to 0.60. Stated differently, a ratio of a radial distance D3 relative to the central axis 11 from the outlet end 31*e* of the shroud 31 to the second location P2 to the radial height H1 is at most 0.8, preferably at most 0.75. In the embodiment shown, the first zone Z1 has a constant radius that may range from 10% to 40%, preferably from 17% to 35% of the radial height H1 of the portion of the shroud 31 that extends radially outwardly beyond the intersection.

In the embodiment shown, the shroud 31 includes a protrusion 31*f* at the outlet end 31*e*. In the present embodiment, the protrusion 31*f* is annular and extends all around the central axis 11. As shown, the protrusion 31*f* extends from the rear side 31*b* of the shroud 31 and away from the gaspath side 31*a*. The protrusion 31*f* may therefore be outside the annular gaspath 20 (FIG. 1) A thickness of the shroud 31 at the protrusion 31*f* may be from about 10% to about 300% greater than the nominal thickness T. The protrusion 31*f* may help in increasing a stiffness of the shroud 31 at the outlet end 31*e* to minimize pressure-induced deflection. The protrusion 31*f* is used to shift a dynamic response frequency of the portion of the shroud 31 that extends radially-outwardly from the intersection with the structural member 32 out of an operating range of excitation frequencies. In the present case, the thickness of the shroud 31 at the outlet end 31*e* is 25% greater than the nominal thickness T.

Figure 7:
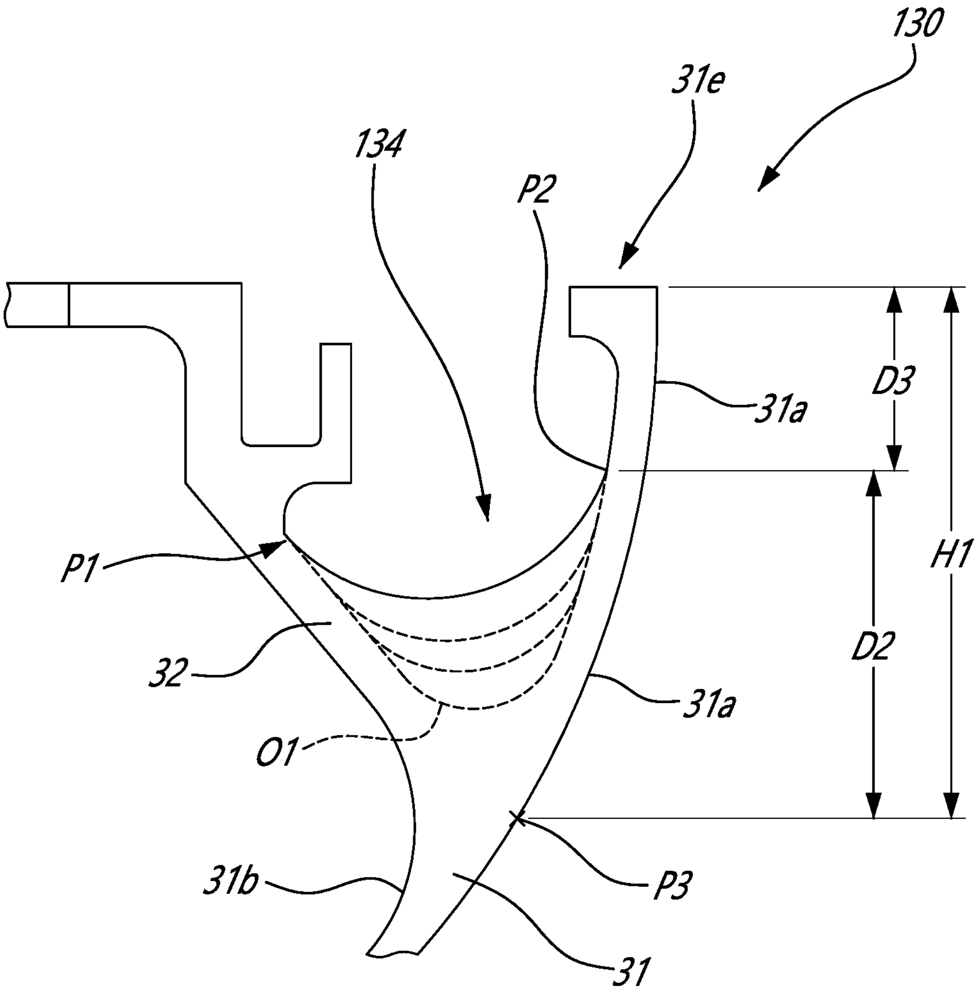
FIG. 7 is a cross-sectional view of a portion of a shroud in accordance with another embodiment.

Referring now to FIG. 7, another embodiment of a housing is shown at 130. For the sake of conciseness, only elements of the housing 130 that differ from the impeller housing 30 described above with reference to FIGS. 3-6 are described below.

The housing 130 includes a reinforced region 134 at the intersection between the structural member 32 and the shroud 31. The reinforced region 134 extends from the first location P1 on the structural member 32 to the second location P2 on the rear side 31*b* of the shroud 31. In the embodiment shown, the reinforced region 134 has a constant radius from the first location P1 to the second location P2. The radius of the reinforced region 134 may be from 10% to 40%, preferably from 17% to 35% of the radial height H1 of the portion of the shroud 31 that extends radially outwardly beyond the intersection. A ratio of a distance D2 from the intersection location P3 to the second location P2 to the radial height H1 of the portion of the shroud 31 that extends radially outwardly beyond the intersection is at least about 0.20 and at most 1, preferably from 0.30 to 0.60.

As shown in FIG. 7, a plurality of possible reinforced regions each having a respective constant radius are shown with dashed lines. The outline O1 shows a configuration in which no reinforced region is used. The outline O1 therefore depicts a simple fillet, which may be created as a result of a diameter of a machining tool used for milling the housing 130. The disclosed housings 30, 130 have a reinforced region 34, 134 that extends beyond a baseline fillet and beyond the outline O1. As shown, the fillet connects to the rear side 31*b* of the shroud 31 at a location that is close to the structural member 32 leaving a majority (e.g., more than 80%) of the portion of the shroud 31 that extends beyond the structural member 32 at the nominal thickness T, free of reinforcement, and subjected to the drawbacks disclosed above. The disclosed reinforced regions 34, 134 connect to the rear side 31*b* of the shroud 31 at a location being at least 20-25% of the radial height H1, whereas a fillet connects the shroud at a location being at most 5-10% of the radial height H1. Hence, a baseline fillet O1 may not be able to offer the added structural support needed to limit deflection of the outlet end 31*e* of the shroud 31.

The impeller housing 30 may be manufactured by multiple machining steps. The part may be turned to create a rough shape as well as several final surfaces. Holes and slots may then milled be into the part. As a relatively large part, weight reduction can be achieved by thinning of various regions but, this must not result in deflections that compromise the impeller shroud's tip clearance. The shroud 31 of the present disclosure includes a reinforced region 34, 134 that allows to locally reinforce the shroud so that it may withstand the forces imparted thereto by air flowing through the centrifugal compressor, but by limiting added weight to the shroud 31. That is, in locations where the highest deflections are expected, such as the outlet end 31*e* of the impeller housing 30, a gradual tapering of material at the impeller housing knee may be implemented. This gradual tapering may reduce the deflection of the shroud 31 compared to a configuration without the reinforced region. Thickening and thinning of the impeller housing may allow the fine tuning of the housing properties such as dynamic response, part deflections and weight reduction.

In the context of the present disclosure, the expression "about" implies a variation by plus or minus 10% of a value. For instance, about 10 includes values from 9 to 11.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, features of the shrouds disclosed in the present disclosure may be applied to a shroud of a centrifugal turbine. Yet further modifications could be implemented by a person of ordinary skill in the art in view of the present disclosure, which modifications would be within the scope of the present technology.

The invention claimed is:

1. A centrifugal compressor for a gas turbine engine, comprising:

an impeller having blades extending from a hub to blade tips, the impeller having an inlet and an outlet; and a housing disposed around the impeller, the impeller rotatable relative to the housing about a central axis, the housing including:

a shroud annularly extending around the blade tips of the impeller and extending in a streamwise direction between a first end proximate the inlet of the impeller and a second end proximate the outlet of the impeller, the shroud having a gaspath side facing the impeller and a rear side opposed to the gaspath side;

a structural member supporting the shroud, the structural member having an outer end securable to a casing of the gas turbine engine, an inner end of the structural member intersecting the rear side of the shroud at a location between the first end and the second end, a portion of the shroud extending radially outwardly from the location, the portion being cantilevered from the structural member, the shroud having a radially-outer portion extending from a projection of the structural member on the gaspath side to the second end, the radially-outer portion having a radial height from the projection to the second end along a radial direction relative to the central axis, the first radius ranging from 10% to 40% of the radial height; and a reinforced region at the location where the structural member and the rear side of the shroud intersect, the reinforced region annularly extending around the central axis, the portion of the shroud supported solely at the reinforced region, a thickness of the reinforced region in a direction normal to the gaspath side being greater than a nominal thickness of the shroud outside the reinforced region, the reinforced region defining a curved surface extending from a first location on the structural member to a second location on the rear side of the shroud, the second location being disposed between the structural member and the second end of the shroud, a portion of the curved surface having a radius that increases from a first radius to a second radius at the second location.

2. The centrifugal compressor of claim 1, wherein the portion of the curved surface is a second zone of the curved surface, the curved surface having a first zone extending from the first location to the second zone, the first zone having a constant radius.

3. The centrifugal compressor of claim 1, wherein the first radius ranges from 17% to 35% of the radial height.

4. The centrifugal compressor of claim 1, wherein the portion of the curved surface merges into the shroud toward the second end of the shroud.

5. The centrifugal compressor of claim 4, wherein the thickness of the reinforced region is maximal at the first location of the reinforced region and decreases to the nominal thickness toward the second end of the shroud.

6. The centrifugal compressor of claim 1, wherein the thickness continuously and monotonically decreases from the first location to the second location.

7. The centrifugal compressor of claim 1, wherein the thickness reaches the nominal thickness between the inner end of the structural member and the second end.

8. The centrifugal compressor of claim 7, wherein the second location is closer to the second end than to the inner end of the structural member.

9. The centrifugal compressor of claim 8, wherein the second location is at least 20% of the radial height from the projection.

10. The centrifugal compressor of claim 1, wherein an intersection between the structural member and the rear side of the shroud is located proximate a knee of the shroud, the knee corresponding to a point where a radial component of a vector normal to the gaspath side of the shroud is equal to an axial component of the vector.

11. The centrifugal compressor of claim 10, wherein the intersection is located a from 30% to 70% of a length of the shroud from the first end, the length of the shroud extending from the first end to the second end along the gaspath side.

12. An impeller housing for an impeller of a centrifugal compressor of a gas turbine engine, comprising:

a shroud annularly extending around a central axis, the shroud having a gaspath side facing the central axis and an opposed rear side, the shroud having a first end proximate an inlet of the impeller and a second end proximate an outlet of the compressor;

a structural member supporting the shroud, the structural member having an outer end securable to a casing of the gas turbine engine, an inner end of the structural member intersecting the rear side of the shroud at a location between the first end and the second end, a portion of the shroud extending radially outwardly from the location, the portion being cantilevered from the structural member; and a reinforced region at the location where the structural member and the rear side of the shroud intersect, the portion of the shroud supported solely at the reinforced region, a thickness of the reinforced region in a direction normal to the gaspath side greater than a nominal thickness of the shroud outside the reinforced region, the reinforced region extending from a first location on the structural member to a second location on the rear side of the shroud, the second location between the structural member and the second end, the thickness of the reinforced region increasing from the nominal thickness at the second location towards the structural member, a ratio of a radial distance (D3) relative to the central axis from the second end to the second location to a radial height (H1) of a portion of the shroud that extends radially outwardly beyond the inner end of the structural member being at most 0.8.

13. The impeller housing of claim 12, wherein a radius of the reinforced region ranges from 10% to 40% of the radial height.

14. The impeller housing of claim 13, wherein the radius ranges from 17% to 35% of the radial height.

15. The impeller housing of claim 12, wherein the portion extends from a projection of the structural member on the gaspath side of the shroud to the second end.

16. The impeller housing of claim 12, wherein a thickness of the shroud taken in a direction normal to the gaspath side is maximal at the first location and decreases to a nominal thickness toward the second end of the shroud.

17. The impeller housing of claim 16, wherein the thickness continuously and monotonically decreases from the first location to the second location.

18. The impeller housing of claim 12, wherein an intersection between the structural member and the rear side of the shroud is located proximate a knee of the shroud, the knee corresponding to a point where a radial component of a vector normal to the gaspath side of the shroud is equal to an axial component of the vector.

19. The impeller housing of claim 18, wherein the intersection is located at from 30% to 70% of a length of the shroud from the first end, the length of the shroud extending from the first end to the second end along the gaspath side.

20. A centrifugal compressor for a gas turbine engine, comprising:

an impeller having blades extending from a hub to blade tips, the impeller having an inlet and an outlet; and a housing disposed around the impeller, the impeller rotatable relative to the housing about a central axis, the housing including:

a shroud annularly extending around the blade tips of the impeller and extending in a streamwise direction between a first end proximate the inlet of the impeller and a second end proximate the outlet of the impeller, the shroud having a gaspath side facing the impeller and a rear side opposed to the gaspath side;

a structural member supporting the shroud, the structural member having an outer end securable to a casing of the gas turbine engine, an inner end of the structural member intersecting the rear side of the shroud at a location between the first end and the second end, a portion of the shroud extending radially outwardly from the location, the portion being cantilevered from the structural member; and a reinforced region at the location where the structural member and the rear side of the shroud intersect, the reinforced region annularly extending around the central axis, the portion of the shroud supported solely at the reinforced region, a thickness of the reinforced region in a direction normal to the gaspath side being greater than a nominal thickness of the shroud outside the reinforced region, the reinforced region defining a curved surface extending from a first location on the structural member to a second location on the rear side of the shroud, the second location being disposed between the structural member and the second end of the shroud, a portion of the curved surface having a radius that increases from a first radius to a second radius at the second location, the second location being closer to the second end than to the inner end of the structural member.

* * * * *